(12) United States Patent
Wellens (10) Patent No.: US 11,600,980 B2
(45) Date of Patent: Mar. 7, 2023

(54) CABLE TROUGH WITH AN INTEGRATED WALKWAY FUNCTION FOR USE IN RAILWAYS

(71) Applicant: TROJAN SERVICES LIMITED, Hove (GB)

(72) Inventor: Stewart Wellens, Hove (GB)

(73) Assignee: TROJAN IP LIMITED, Hove (GB)

(*) Notice: Subject to any disclaimer, the term of this patent is extended or adjusted under 35 U.S.C. 154(b) by 0 days.

(21) Appl. No.: 16/616,071

(22) PCT Filed: Mar. 29, 2018

(86) PCT No.: PCT/GB2018/050886
§ 371 (c)(1),
(2) Date: Nov. 22, 2019

(87) PCT Pub. No.: WO2018/215730
PCT Pub. Date: Nov. 29, 2018

(65) Prior Publication Data
US 2020/0144804 A1    May 7, 2020

(30) Foreign Application Priority Data
May 23, 2017   (GB) ................................. 1708253

(51) Int. Cl.
   *H02G 9/04*   (2006.01)
   *E01C 9/06*   (2006.01)
   *B60M 5/00*   (2006.01)
(52) U.S. Cl.
   CPC ............. *H02G 9/04* (2013.01); *E01C 9/06* (2013.01); *B60M 5/00* (2013.01)

(58) Field of Classification Search
   CPC ....................................................... H02G 13/80
   USPC ............................................................ 174/200
   See application file for complete search history.

(56) References Cited

U.S. PATENT DOCUMENTS

| | | | |
|---|---|---|---|
| 7,224,880 B2 * | 5/2007 | Ferris ................... | G02B 6/4459 174/68.3 |
| 2007/0092916 A1 * | 4/2007 | Kulaksiz ............... | C07K 16/26 435/7.5 |
| 2011/0278038 A1 * | 11/2011 | Wellens ................. | B60M 5/00 174/39 |
| 2013/0121761 A1 | 5/2013 | Dixon | |

FOREIGN PATENT DOCUMENTS

| | | |
|---|---|---|
| FR | 3038329 A1 | 1/2017 |
| WO | 9401907 A1 | 1/1994 |
| WO | 9421018 A1 | 9/1994 |
| WO | 9847212 A1 | 10/1998 |

(Continued)

OTHER PUBLICATIONS

PCT International Search Report and Written Opinion for International Application No. PCT/GB2018/050886, dated Jun. 14, 2018, 2018, 12 pages.

(Continued)

*Primary Examiner* — Stanley Tso
(74) *Attorney, Agent, or Firm* — Hoffman Warnick LLC (57) ABSTRACT

Disclosed is a combined cable trough and walkway (1) comprising a trough (200a) and a lid, the trough (200a) comprising two trough units (200) arranged to be coupled together end to end to form the trough (200a).

17 Claims, 6 Drawing Sheets

(56) References Cited

FOREIGN PATENT DOCUMENTS

| WO | 2006040567 A1 | 4/2006 | |
|---|---|---|---|
| WO | WO 2011/073603 * | 12/2009 | ............... H02G 9/04 |
| WO | 2010086659 A2 | 8/2010 | |
| WO | 2011073603 A1 | 6/2011 | |
| WO | 2015135601 A1 | 9/2015 | |

OTHER PUBLICATIONS

Great Britain Search Report for Application No. GB1708253.8, dated Nov. 24, 2017, 4 pages.

* cited by examiner

CABLE TROUGH WITH AN INTEGRATED WALKWAY FUNCTION FOR USE IN RAILWAYS

The present invention concerns a combined cable trough and walkway for use primarily in a railway environment for routing and carrying communication and/or power cables and which also has a function as a safe level walkway beside a railway track.

Railway tracks are frequently laid on uneven ground which has been topped off with ballast, which is essentially rubble. When railway technicians and engineers are required to work on the railway, they often have to walk significant distances alongside the railway track over this ground. The unevenness of this ground poses a problem for the workers and makes it difficult to transport tools and equipment if there is no corresponding access roadway.

In the UK, Network Rail, the owners and operators of the rail infrastructure, have in place regulations that dictate certain requirements for provision of a safe and level walkway alongside railway tracks. Currently, such walkways tend to consist of flattened and compressed earth and are not generally suitable to transport tools and equipment.

At the same time, there is a requirement to provide routing for cables alongside railway tracks. These cables can be used for transmitting power around the railway network, or for signalling and communication purposes. Sometimes, third parties lease space in the routing system and make use of the extensive railway network to route their own communication cables around the country.

Accordingly, there is a need to provide a system for implementing walkways to run alongside railway tracks in a quick, easy and economic manner, which can be easily retrofitted to existing railway infrastructure.

Embodiments of the present invention aim to address problems in the prior art, and other problems whether mentioned explicitly herein or not.

According to the present invention there is provided an apparatus and method as set forth in the appended claims. Other features of the invention will be apparent from the dependent claims, and the description which follows.

For a better understanding of the invention, and to show how embodiments of the same may be carried into effect, reference will now be made, by way of example, to the accompanying diagrammatic drawings in which.

Prior art cable troughs with an integrated walkway function are known in the prior art. However, some of these can suffer from certain disadvantages, particularly if not installed correctly. Certain particular problems will be described in the following.

FIGS. 1 to 10 show various views of one or more components or sub-components according to an embodiment of the invention, and the following description may refer to any one or more of the figures, unless specifically stated otherwise.

FIGS. 1 to 4 show various views of a complete assembled trunking component according to an embodiment of the invention. The completed trunking unit 1 comprises two major components: a trough 200a comprising two trough sections 200 and a lid comprising two lid sections 100. The two trough sections 200 forming the trough are identical. The two lid sections 100 forming the lid are identical.

In order to form the trough 200a, two identical trough components 200 are connected together. The individual trough unit 200 is shown in more detail in FIGS. 7 and 8.

Figure 7:
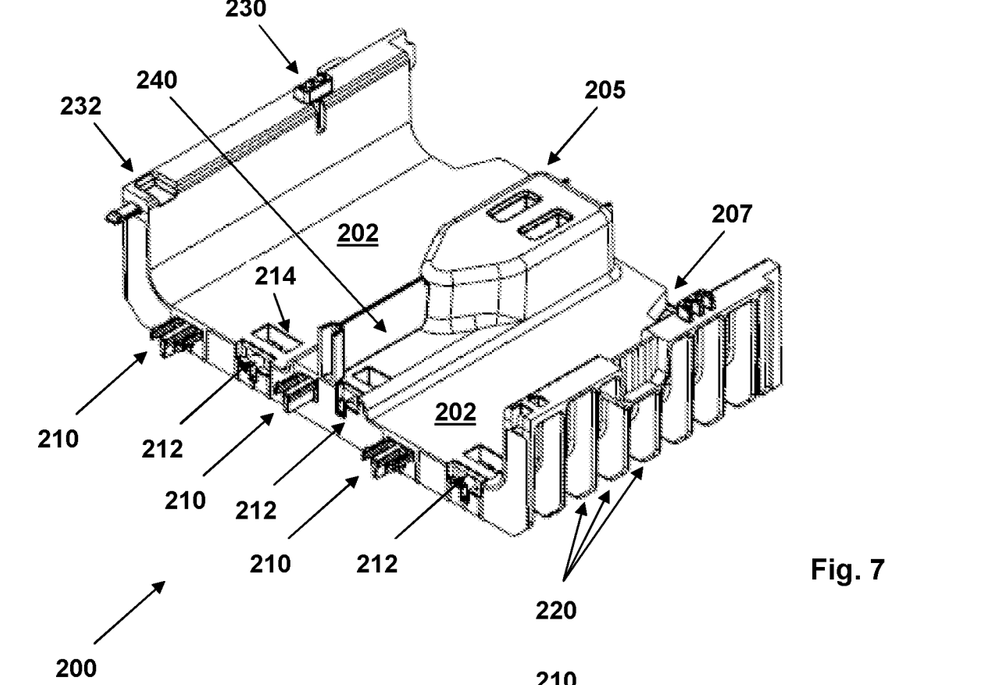
FIG. 7 shows an upper perspective view of a trough component according to an embodiment of the present invention.
Figure 8:
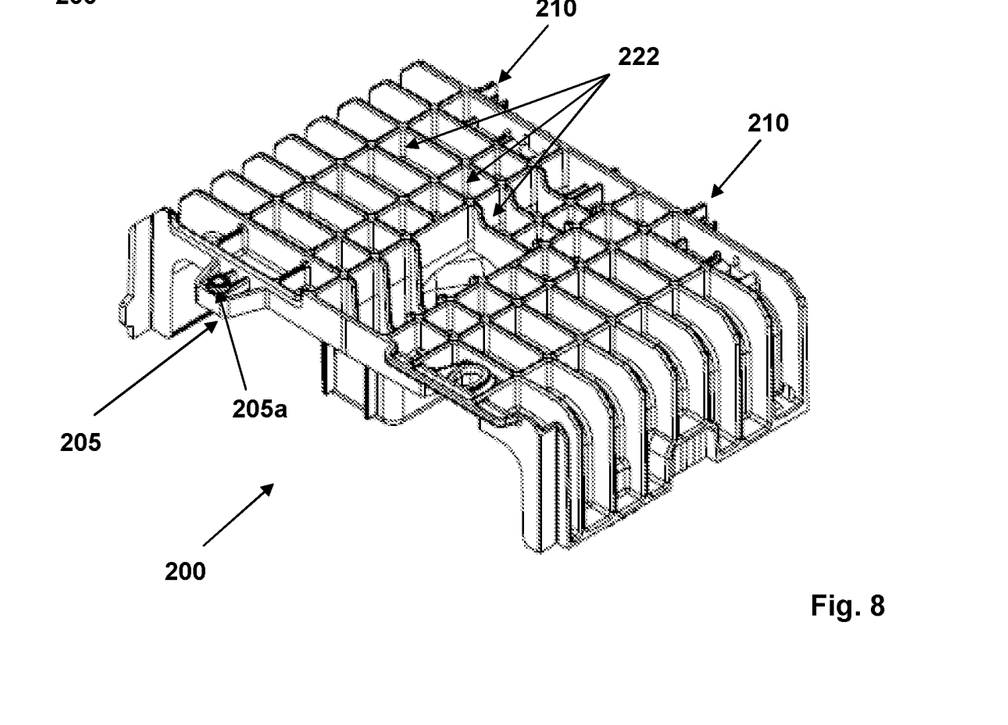
FIG. 8 shows a lower perspective view of a trough component according to an embodiment of the present invention.

Each trough unit 200 forms half of the length of a complete trough 200a. Each trough unit 200 is provided with fastening means 210, 212 to interconnect the two identical trough units 200. Fastening means 210 are male connectors and fastening means 212 are mutually couplable female connectors. The male connectors 210 are provided with resilient, keyed members which, once inserted into the female connectors 212, form a semi-permanent connection, in a snap-fit manner. In order to release the two trough units 200 (which is not normally necessary) a suitable tool, such as a screwdriver, may be inserted into apertures 214 to overcome the locking mechanism and so free the two trough units 200.

Once connected, the two trough units 200 form a competed trough 200a, which is then suitable for use. Use involves laying a plurality of such troughs end to end, usually in a pre-prepared trench or channel alongside a railway track. However, the troughs may be positioned to sit atop a prepared surface and remain proud of the ground surface. The walkway is defined by the length of the troughs, laid end to end.

Figure 1:
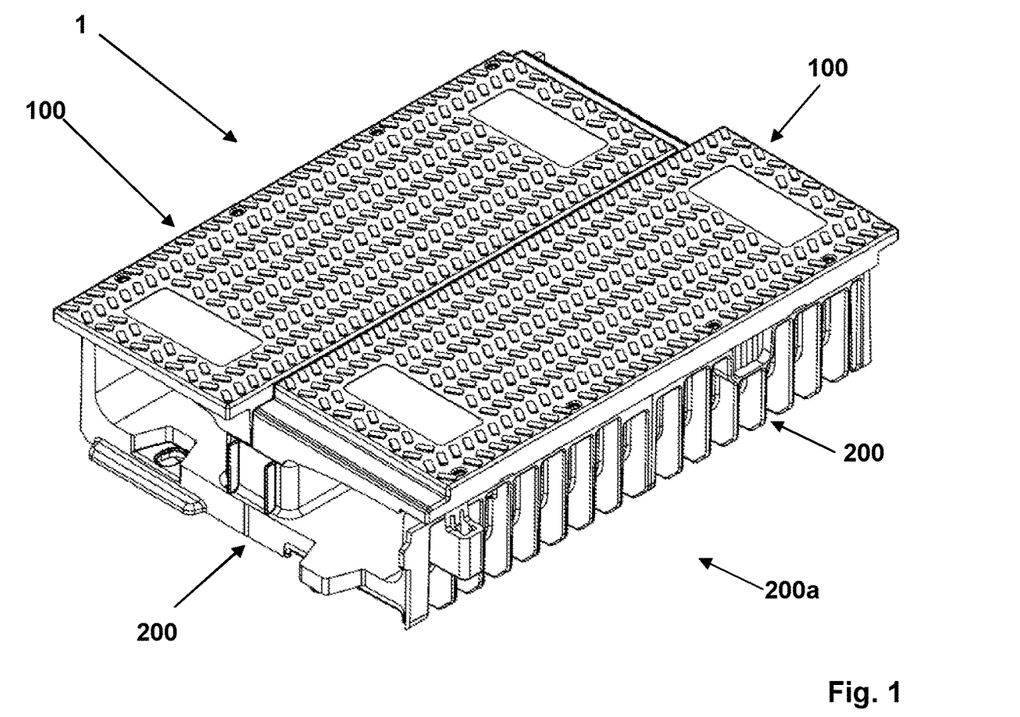
FIG. 1 shows a view of an upper surface of a trunking component according to an embodiment of the present invention.
Figure 2:
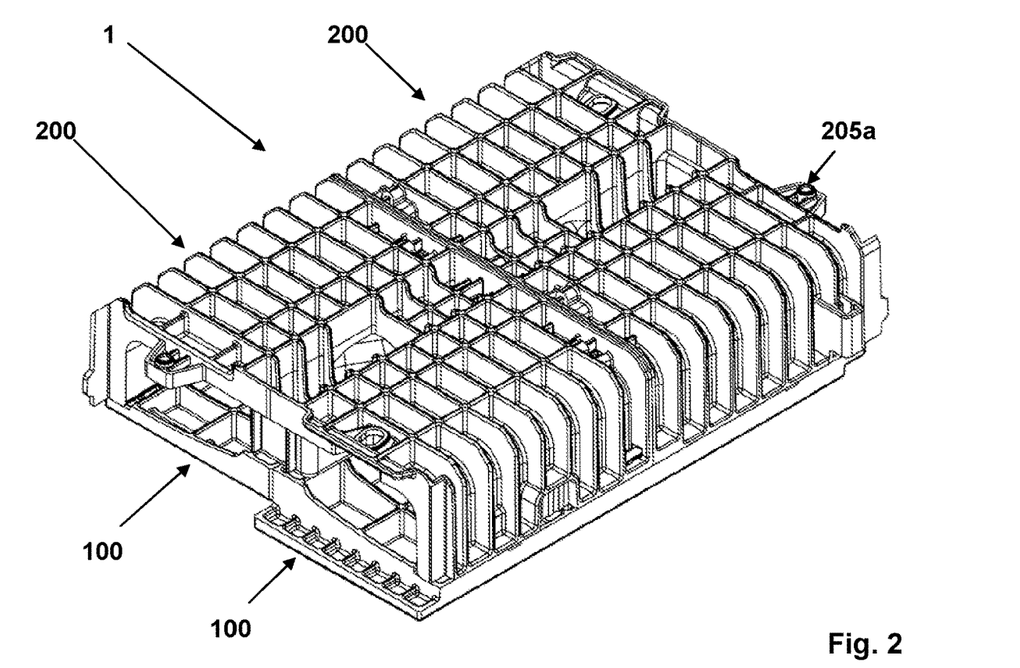
FIG. 2 shows a view of a lower surface of a trunking component according to an embodiment of the present invention.
Figure 5:
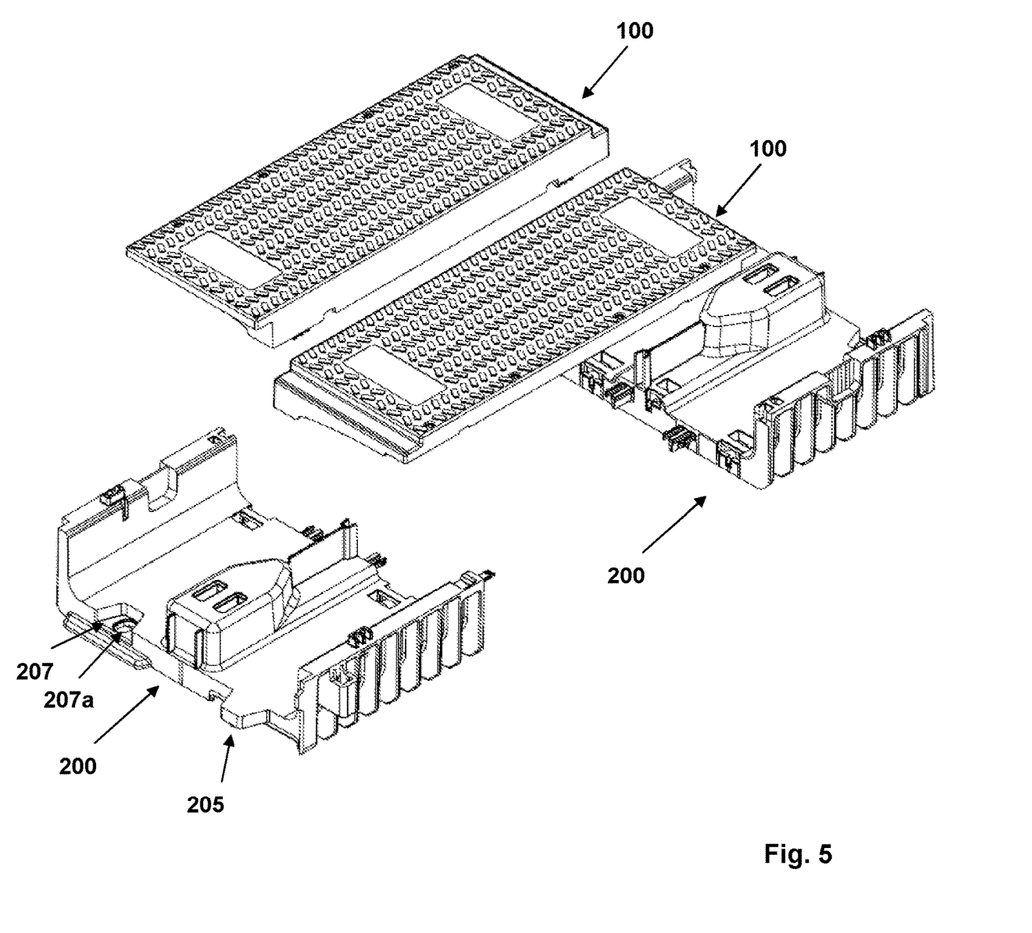
FIG. 5 shows an exploded view of a trunking component an embodiment of the present invention.
Figure 6:
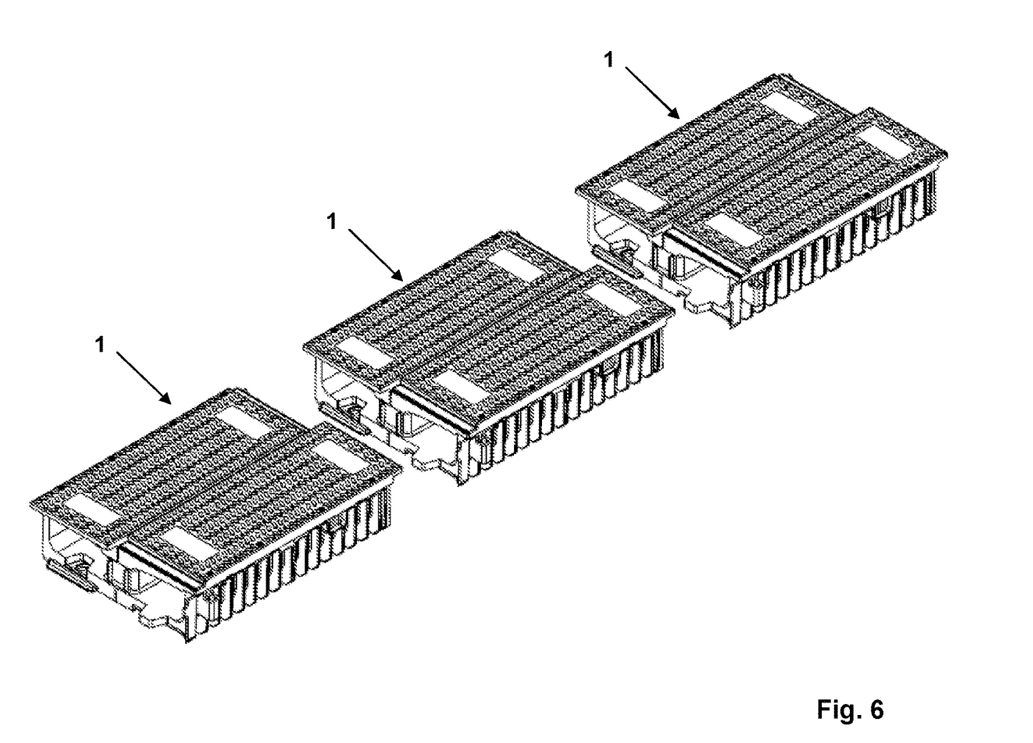
FIG. 6 shows an exploded view of several trunking components prior to their interconnection.

In order to couple respective troughs 200a, to form the walkway, a different form of coupling is employed to the one described above which is used to connect two trough units 200. The inter-trough coupling is best shown in FIGS. 1 and 5. A male connector 205 is provided which couples with a female connector 207. The male connector 205 is in the form of a projection which extends from an end of the trough 200a and is situated on an opposite side of the trough 200a to the female connector 207. The female connector is in the form of a generally recessed portion which broadly conforms to the shape and size of the male connector 205, such that when two troughs 200a are placed end to end, the male connector 205 of a first trough enters the female connector of a second trough and vice-versa. The interconnection between troughs 200a is not intended to be a rigid unmovable connection. In fact, provision is made to allow a small relative movement between adjacent troughs 200a. This small amount of relative movement allows a length of troughing formed from a large number of troughs 200a to curve to follow a curve in a railway track. The amount of curvature required to be accommodated is relatively small, since the amount of curvature allowed and possible with railway tracks is in the region of 2°.

The small amount of relative movement also accommodates a degree of expansion and/or contraction experienced with changing ambient temperature conditions.

On the underside of the male member 205 is a projection 205a which extends downwardly and sits, in use, in a corresponding, but larger aperture 207a, provided in the base of the female connector 207. The larger aperture 207a provides the small amount of relative movement required while ensuring that the connection is maintained.

The trough 200a comprises two channels 202, which are formed from a sidewall and central divider. The central divider is formed from a pier or support 205, which is a relatively wide structure positioned at each end of the trough 200a and a relatively thin wall 240. The relatively thin wall 240 is intended to be removed if communication is required between the two channels 202. To remove the wall 240, it can be cut out with snips or a knife or, alternatively, it may comprise one or more pre-weakened portions so that it can be struck, with a hammer, for instance.

Pier 205 is provided to not only divide the trough 200a into two channels, but also to support the lid 100, when fitted. Further details will follow later.

When the trough 200a is situated in a trench or channel, it is then surrounded or backfilled with gravel or hardcore to keep it in position. To assist in anchoring the trough 200a in position, the exterior sidewalls and lower surface are provided with ridges 220, 222 into which gravel can pass.

Figure 9:
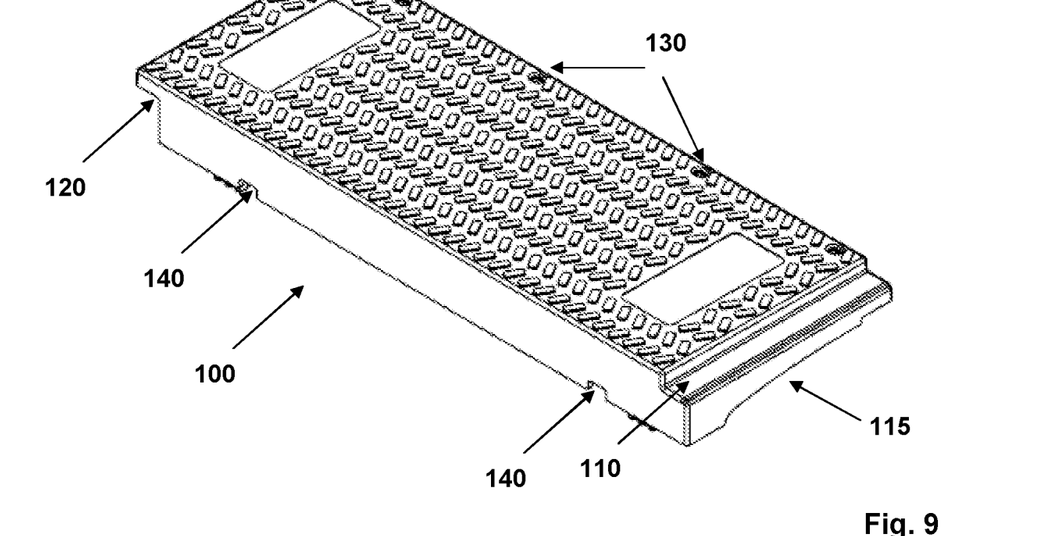
FIG. 9 shows an upper perspective view of a lid component according to an embodiment of the present invention.
Figure 10:
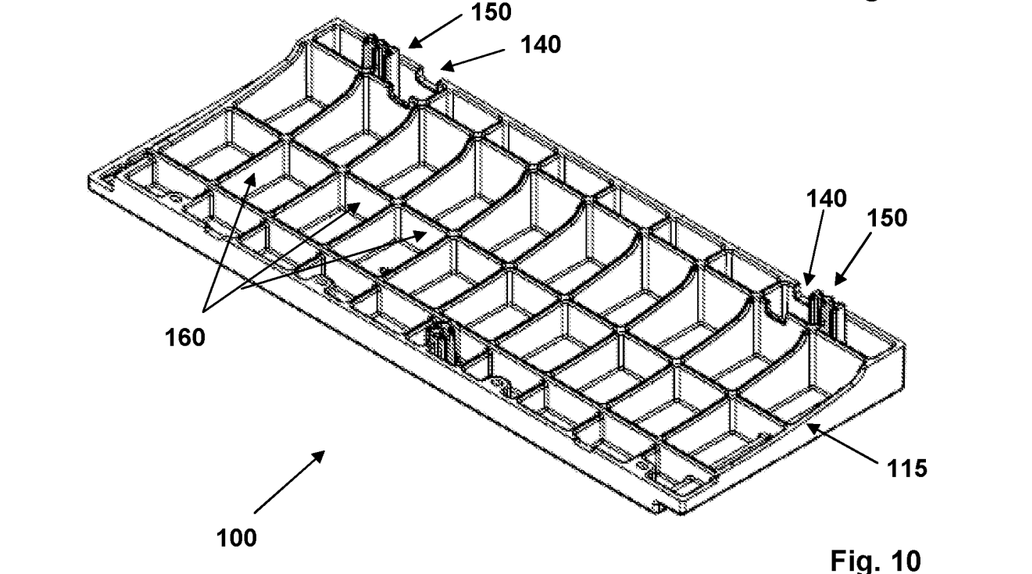
FIG. 10 shows a lower perspective view of a lid component according to an embodiment of the present invention.

Once the cables are located in the continuous length of troughing, the lid sections 100 can be fitted. Like the trough sections 200, the lid sections 100 are identical i.e. there are not left and right variants. The lid sections 100 are best illustrated in FIGS. 9 and 10.

Each lid section comprises a relatively planar upper surface which can act as a walkway once fitted. The lid may be provided with a roughened or textured upper surface to assist with grip when it is walked on. The upper surface has an outer edge which, once fitted to the trough, sits atop its external sidewall, and an inner edge which, once fitted to the trough, sits adjacent to another inner edge of a neighbouring lid section 100 and which sits atop the pier 205.

The lower surface of the lid section 100 is provided with a plurality of interconnecting ribs 160 which provide additional strength and rigidity to the lid section 100.

The lid section is generally thicker at one edge than another opposite edge and these edges are joined by a tapering portion 115. The relatively ticker portion is arranged to sit on the pier 205 and the generally thinner portion is arranged to sit on an outer edge of the assembled trough 1.

When the lid sections 100 are placed atop the troughs 200a, they are interlocked using a stepped arrangement. Each lid section has an undercut area 110 and, on an opposite end, an overhang 120. When in position, the overhang 120 sits atop the undercut portion 110 so that the continuous surface formed from the plurality of lid sections is substantially level and flat. This can best be seen in FIG. 6, which shows a partially exploded view of completed troughs 200a, with lid sections 100a fitted.

In order to hold the lid sections 100 in position atop the trough 200a, each trough 200a and lid 100 is provided with complementary connection features. Each lid 100 has a pair of projections 150 arranged to sit inside complementary apertures 232 in each trough 200a. And each trough 200a has a pair of projections 230 arranged to sit inside complementary apertures 140 in each lid section. In use, each lid section may be secured in position by screws, which are fastened through apertures 130 provided in the lid section 100, which fasten securely into the trough 200a. However, such screw fastenings may not be required in all circumstances and the lid may simply rest on the trough.

Figure 3:
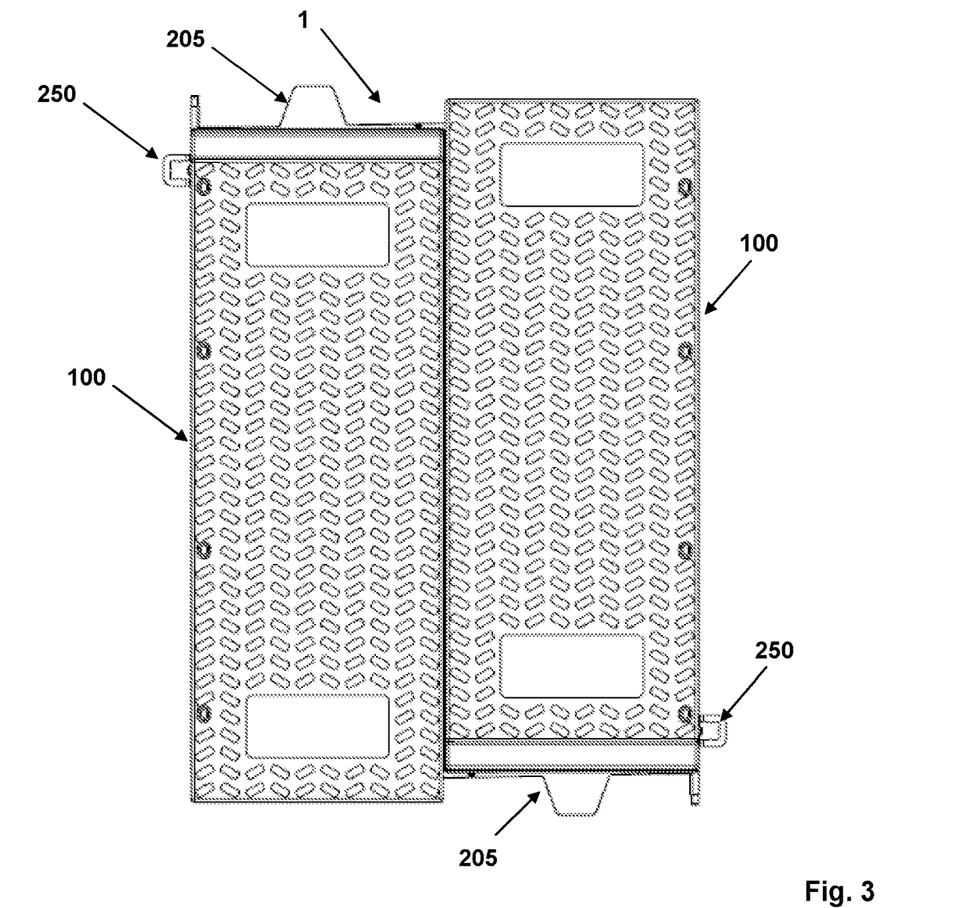
FIG. 3 shows a plan top view of a trunking component according to an embodiment of the present invention.
Figure 4:
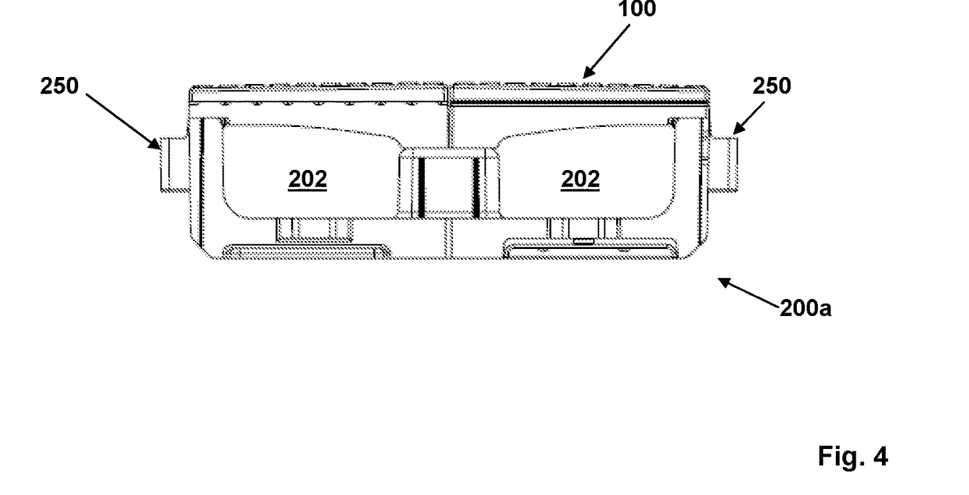
FIG. 4 shows an end view of a trunking component according to an embodiment of the present invention.

As can be seen in FIGS. 3 and 4, each trough section 200 is provided with a handrail coupling point 250. This takes the general form of a loop which extends from an outer sidewall of each trough section 200, through which can be placed an upright member, which can form a support for a continuous handrail, if required.

A key advantage provided by forming each trough 200a from two identical trough sections 200, which each span the entire width of the troughing, is that improved lateral strength is provided. This is compared to another alternative means of modular construction where a completed trough unit is formed from two units which sit side by side (rather than end to end as in embodiments of the invention), where pressure exerted by the surrounding backfilled material can, in some cases, cause the sides of the completed trough to bow inwardly, which can distort the completed trough and cause the lid to become displaces. In extreme cases, the structural integrity of the entire trough can be compromised.

However, by ensuring that each individual trough section 200 is structurally sound in a lateral direction i.e. to resist pressure from surrounding material on either side, then structural integrity can be preserved for the entire troughing system.

Both lid sections and trough sections are preferably formed in a moulding process from a plastics material. The plastics material comprises a polymer which is preferably recycled. In a preferred embodiment the preferred polymer is a polyolefin. The components 100, 200 are preferably constructed using an injection moulding process.

Each individual component weighs significantly less than the safe working limit for individual manual handling limits. Indeed, in preferred embodiments, the complete trough 200a (formed from two trough sections 200) weighs less than the weight limit.

By careful design choices, identical trough sections 200 can be interconnected to form a trough unit 200a. This reduces the number of different components which are required to be designed, manufactured, transported and stored. The same applies to the lid sections 100.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A combined cable trough and walkway (1) comprising a trough (200*a*) and a lid, the trough (200*a*) comprising two trough units (200) arranged to be coupled together end to end to form the trough (200*a*), such that each trough unit (200) has a width identical to a width of the trough (200*a*) and a length equal to half of a length of the trough (200*a*) and wherein the trough (200*a*), comprising the two trough units (200), is arranged to be coupled to one or more further troughs (200*a*), each of the one or more troughs (200*a*) comprising two further trough units (200), wherein a connection between the two trough units (200) is of a different type to a connection between two adjacent troughs (200*a*).

2. The combined cable trough and walkway of claim 1 wherein the direction of the end to end connection of the trough units (200) corresponds to the direction and length of the walkway.

3. The combined cable trough and walkway of claim 1 wherein the two trough units (200) are identical.

4. The combined cable trough and walkway of claim 1 wherein the lid comprises two identical lid sections (100).

5. The combined cable trough and walkway of claim 4 wherein each lid section tapers from a thick edge to a thin edge.

6. The combined cable trough and walkway of claim 1 wherein the connection between two adjacent troughs (200*a*) comprises a pair of complementary male (205) and female (207) connectors.

7. The combined cable trough and walkway of claim 6 wherein the connection between two adjacent troughs (200*a*) permits movement.

8. The combined cable trough and walkway of claim 7 wherein the movement between the adjacent troughs (200*a*) is 2 degrees from a notional straight line connecting a centre line of the adjacent troughs.

9. The combined cable trough and walkway of claim 1, wherein the lid covers each of the two trough units (200).

10. The combined cable trough and walkway of claim 9, wherein the direction of the end-to-end connection of the trough units (200) corresponds to the direction and length of the walkway.

11. The combined cable trough and walkway of claim 9, wherein the two trough units (200) are identical.

12. The combined cable trough and walkway of claim 9, wherein the lid comprises two identical lid sections (100).

13. The combined cable trough and walkway of claim 12, wherein each lid section tapers from a thick edge to a thin edge.

14. The combined cable trough and walkway of claim 9, wherein a connection between the two trough units (200) is different to a connection between two adjacent troughs (200*a*).

15. The combined cable trough and walkway of claim 14, wherein the connection between two adjacent troughs (200*a*) comprises a pair of complementary male (205) and female (207) connectors.

16. The combined cable trough and walkway of claim 15, wherein the connection between two adjacent troughs (200*a*) permits movement.

17. The combined cable trough and walkway of claim 16, wherein the movement between the adjacent troughs (200*a*) is 2 degrees from a notional straight line connecting a centre line of the adjacent troughs.

* * * * *